June 22, 1965  D. R. HAZELQUIST  3,191,135
SELF-MOUNTING ELECTRICAL APPARATUS
Filed April 15, 1963

INVENTOR.
DONALD R. HAZELQUIST
BY *Alfred N. Feldman*

ATTORNEY

United States Patent Office 3,191,135
Patented June 22, 1965

3,191,135
SELF-MOUNTING ELECTRICAL APPARATUS
Donald R. Hazelquist, St. Louis Park, Minn., assignor to Honeywell Inc., a corporation of Delaware
Filed Apr. 15, 1963, Ser. No. 272,966
10 Claims. (Cl. 336—65)

The present invention is broadly directed to a mounting means for an electrical apparatus, and, more particularly, is directed to an integrally molded bobbin utilized in many electrical devices and which incorporates a pair of mounting flanges.

In the last few years, many small electrical devices have been fabricated with winding forms of the bobbin type molded in an integral form from a thermoplastic material. This type of winding form in the past has been more costly than other forms of winding techniques due to problems related to insulating the initial turns of wire and in their general fabrication. Certain of these problems have been overcome recently and the winding forms have become very common in devices such as relays, small transformers, inductors, and similar types of electrical devices. With the advent of this more expensive winding form or bobbin, many other problems have arisen. The bobbins generally require slightly more space than the older styles of "stick-wound" coils and, therefore, means to reduce the size of the mounting and to reduce the cost of the device have been suggested.

The present invention is broadly directed to an integral mounting flange molded on a winding form or bobbin and which permits the mounting of electrical apparatus by merely snapping the electrical apparatus into slots in a chassis or mounting panel. This type of an arrangement eliminates certain mounting parts normally utilized thereby reducing costs and also eliminates certain types of electrical problems. The mounting of bobbins in this particular fashion, however, must meet certain rigid standards as far as stability is concerned, and must not add any to the already higher cost of switching or changing to molded forms. As such, the present invention provides a self-mounting electrical apparatus which does not substantially increase the cost, but tends to decrease the mounting cost of a conventional device such as a relay or small transformer.

It is a primary object of the present invention to disclose a simplified positive mounting means for electrical apparatus such as transformers, relays, etc.

Another object of the present invention is to disclose a mounting means that can be snapped into place and positively locked against inadvertent removal of the device.

Yet another object of the present invention is to disclose a device which is reduced in cost as no extra parts need be handled in the assembly or mounting of the electrical apparatus.

And yet another object of the present invention is to disclose a mounting means that is formed of an electrical insulating material and which therefore causes no new insulating problems, as well as, electrically isolates the ordinary magnetic structure and electrical structure of a conventional electrical apparatus.

These and other objects will become apparent when the present specification is considered along with the drawings, wherein.

Figure 1:
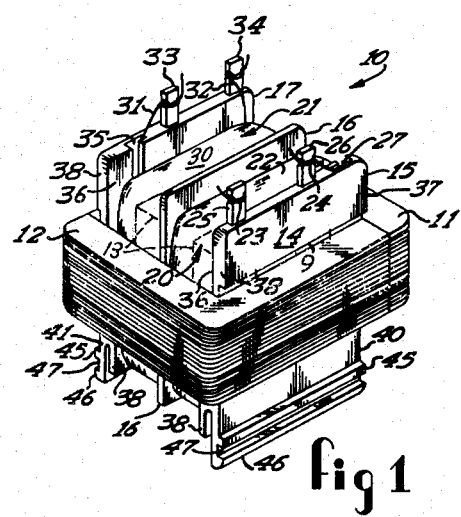
FIGURE 1 is a perspective view of a small transformer utilizing the present invention.

Disclosed generally in FIGURE 1 there is a transformer 10 of a conventional design. The transformer 10 has pairs of F-shaped laminations 11 and 12 stacked to form a complete magnetic core and which interlock in a manner well known in the transformer art. The laminations 11 and 12 pass through the center of a bobbin 14 which has a central opening 9 that forms a winding portion 13 for the transformer 10. When the laminations 11 and 12 are pressed together into the bobbin 14, the center (not shown) leg of the laminations lock together to form a unitary magnetic circuit. This type of transformer construction has been marketed by the assignee of the present application for many years.

The bobbin 14 forms an electrically insulated winding form having a plurality of flanges 15, 16, and 17. The flanges 15, 16, and 17 are all joined by the winding portion 13 and provide two winding spaces 20 and 21. Placed in the winding space 20 is a coil of insulated wire 22 which has its ends 23 and 24 connected to terminals 25 and 26. The end 24 passes through a slot 27 in flange 15 in a manner so as to insulate the end 24 from the turns of wire 22 that form the coil of wire on the bobbin. Winding space 21 has a similar coil of wires 30 which have ends 31 and 32 wrapped around terminals 33 and 34. The end 31 comes up through an insulating slot 35 in the same fashion that the end 24 came up in the insulating slot 27. The general style of winding form and the insulating slots form no part of the present invention and are a form of thermoplastic molded bobbin used in many forms of electrical equipment marketed by the assignee of the present invention. A description of these forms has been made in order to facilitate an explanation of the problems solved by the present invention in its various forms.

Each of the flanges 15 and 17 have a first side 36 adjacent a winding space and a second side 37 remote from the first side and joined to it by a peripheral edge 38. For all practical purposes, the flanges 15 and 17 are the same in configuration, but reversed in position from one another.

The transformer 10 which has been described to this point in the specification is a conventional type of transformer. The same type of general structure could be utilized with a relay, inductance, or other device having greater or fewer numbers of winding spaces, as long as two flanges are provided in a spaced relationship with the invention of the present application. This invention can probably be best explained with further description of FIGURE 2.

Figure 2:
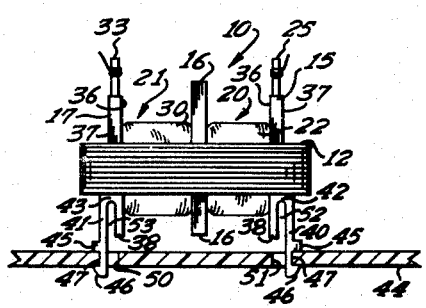
FIGURE 2 is an elevation of the device of FIGURE 1 mounted in a panel.

In FIGURE 2, the transformer 10 has been generally shown along with the flanges 15, 16, and 17. The laminations 12 are again shown in elevation and the windings 22 and 30 are disclosed placed between the flanges 15, 16, and 17. The terminals 25 and 33 are shown, as a matter of reference.

Beneath the laminations 12, there is shown a pair of grooved resilient mounting means 40 and 41, which are attached at 42 and 43 to the second sides or outer sides 37 of each of the flanges 16 and 17. The grooved resilient mounting means 40 and 41 project substantially beyond the peripheral edges 38 of the flanges 16 and 17 to hold the transformer 10 above a mounting panel 44. The grooved resilient mounting means 40 and 41 are in fact integrally molded at 42 and 43 to the bobbin upon which the winding means are placed. The joints 42 and 43 are as far up on the second or outer sides 37 of the flanges 15 and 17 as possible without interfering with the laminations 12, for a purpose that will be explained below. Each of the grooved resilient mounting means 40 and 41 have raised portions 45 and 46 and an intermediate groove 47. The raised portions 45 and 46 with the groove 47 are shown in elevation in FIGURE 2 and are clearly shown in perspective in FIGURE 1.

The mounting panel 44 has been shown with a pair of openings 50 and 51. The two openings 50 and 51 are rectangular in cross section and the resilient groove mounting means 40 and 41 are depressed and allowed to pass through the openings 50 and 51 and then spring outwardly so that the panel 44 fills the grooves 47 with the raised portions 45 and 46 on either side of the panel 44. This holds the transformer 10 in a mounted position above the panel 44. It should be noted that the resilient grooved mounting means 40 and 41 are spaced by grooves or spaces 52 and 53 from the second or outer sides 37 of flanges 15 and 17. This allows room for the resilient flexure of the mounting means 40 and 41 in an inward direction so that they will pass into the openings 50 and 51.

When a winding form of the type generally disclosed in the present application has a laminated structure placed upon it, along with the appropriate windings, it takes on a very rigid form. As such, with the windings 22 and 30 in place, along with the laminations 11 and 12 to form the transformer 10, the outer two flanges 15 and 17 become very rigid and fixed in position and could not normally be deflected for mounting purposes if they themselves were extended to form the mounting members without the mounting members being exceedingly long. By attaching the grooved resilient mounting means 40 and 41 to the outer or second sides 37 of the flanges 15 and 17 at a point close to the winding portion or center of the device, it becomes possible for the mounting means 40 and 41 to be deflected into the spaces 52 and 53, so that the resilient mounting of the transformer 10 can take place.

It thus becomes obvious that a mounting means has been provided for a transformer or other electrical apparatus of a similar type that normally has windings, or windings and a magnetic structure, without the addition of any miscellaneous parts, such as nuts, bolts, bushings, or similar types of structure. This arrangement therefore provides a very economical and rapid means of mounting an electrical apparatus. The present mounting means also mounts the transformer 10 away from panel 44 by an insulating member, thereby improving the isolation of the transformer 10 from the panel 44. This improves the electrical insulation of the electrical apparatus and provides a benefit from a safety standpoint.

The device disclosed in FIGURES 1 and 2 can, during shipment, when mounted on a panel 44, be subjected to unusual jolts or shocks. In order to guarantee that the device remains mounted on panel 44 and does not spring loose by having the grooved resilient mounting means 40 and 41 slip back through the holes 50 and 51, a locking means can also be provided. This locking means is shown in detail in one form in FIGURE 3.

Figure 3:
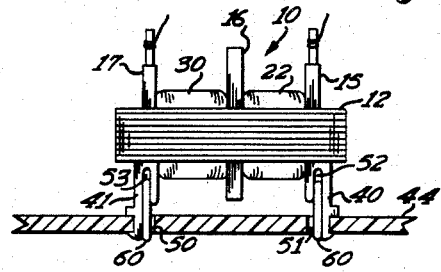
FIGURE 3 is an elevation of the device of FIGURE 1 mounted on a panel and locked in place.

In FIGURE 3, a transformer 10 has been disclosed mounted on a panel 44 by the grooved resilient mounting means 40 and 41. Again, the holes or openings 50 and 51 are provided and the transformer 10 is mounted in identically the same fashion as is disclosed in FIGURE 2. Many of the reference numerals have been left off of this figure for the sake of clarity. In order to insure that the grooved resilient mounting means 40 and 41 do not reflect in the openings 50 and 51, a pair of wedge means 60 have been inserted in the openings 50 and 51 along the inner edges of the mounting means 40 and 41 and extending up into the grooves 52 and 53. The wedges 60 are selected of sufficient size so that they frictionally engage in the grooves 52 and 53 and are held tightly in place, thus stiffening mounting means 40 and 41. The wedges 60 also could take up the remaining space in the openings 50 and 51 and prevent the grooved resilient mounting means 40 and 41 from being deflected thereby locking the transformer 10 positively in the position shown. The reduction of the size of the openings 50 and 51 is not essential as long as the wedges 60 fill the grooves 52 and 53 to stiffen the mounting means 40 and 41 against deflection.

Figure 4:
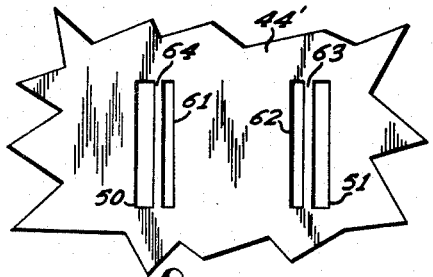
FIGURE 4 is a top view of a portion of a mounting panel or chassis incorporating a modification of the present invention.

FIGURES 4–7 disclose a modification of the panel in which the locking or wedging means is of a different form. In FIGURE 4, a top view of a panel 44' is disclosed having openings 50 and 51 disclosed therein. Placed immediately adjacent the openings 50 and 51 are two slots 61 and 62 which leave small webs of material 63 and 64 separating the two openings 51 and 62 and the openings 50 and 61. It should be noted that the panel 44' should be made up of a material, such as sheet metal, so that the material can be readily deformed.

Figure 5:
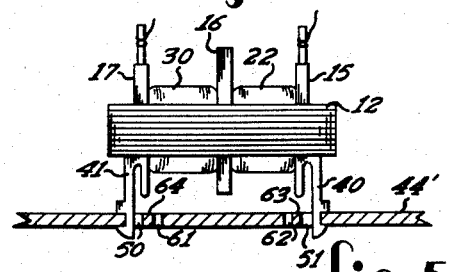
FIGURE 5 is an elevation of a transformer of the type of FIGURE 1 mounted on a panel of the type disclosed in FIGURE 4.
Figure 6:
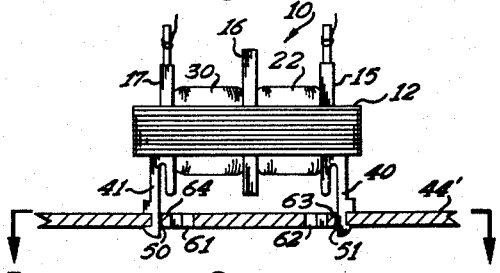
FIGURE 6 is an elevation similar to FIGURE 5 with the locking feature activated.

In FIGURE 5, a transformer 10 is mounted by the resilient means 40 and 41 through the openings 50 and 51 in the same fashion as the mounting in FIGURE 2. It will be noted that the openings 61 and 62 with their associated web 63 and 64 are shown. The webs 63 and 64 are used as wedge means to lock the device as is shown in FIGURE 6. The transformer 10 is mounted on the panel 44' by the resilient mounting means 40 and 41 but the webs 63 and 64 have been bent outwardly from the openings 61 and 62 so as to bear on the backs of the grooved resilient mounting means 40 and 41. This reduces the dimension of the original openings 50 and 51 so that the grooved resilient mounting means 40 and 41 cannot be deflected to remove the transformer 10 from the mounting position.

Figure 7:
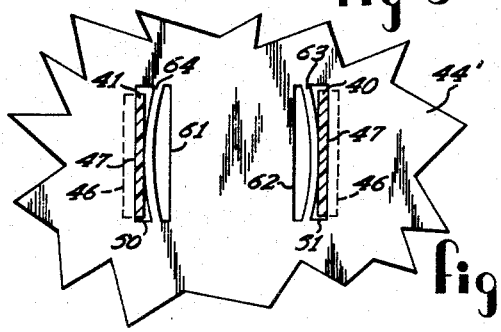
FIGURE 7 is a section of FIGURE 6 along line 7—7.

In FIG. 7, a top view of the panel 44' has been disclosed with the webs 63 and 64 bent so as to reduce the size of the openings 50 and 51. It becomes obvious that the grooved resilient mounting means 40 and 41 cannot be removed once the webs 63 and 64 have been bent to the shape disclosed in FIGURE 7 and therefore the electrical apparatus is permanently locked onto the panel 44'. It becomes apparent in this case that wedge means have been provided that locks the transformer 10 into place and does not add any complexity to the present device. Since the normal mounting panel is of metal, the configuration disclosed in FIGURES 4–7 can be readily adapted in the mounting of most electrical devices and provides a locked, insulated mounting of an integral nature for the bobbin of the electrical device or apparatus used and does not add any complexity or unusual cost to the apparatus itself.

It becomes apparent from the above discussion of two of the many locking means utilized with the present self-mounting electrical apparatus, that the form in which the invention is utilized can be varied extensively by one skilled in the art. The more readily apparent and commercially useful forms have been disclosed, but the applicant in no way wishes to be limited to the scope of the device as disclosed in the drawings. The scope of the present invention should be considered only in light of the appended claims.

I claim as my invention:

1. A self-mounting electrical apparatus, including: an electrically insulating winding form including a pair of flanges joined by winding portion means; each of said flanges having a first side adjacent said winding portion means, a second side remote from said first side, and a peripheral edge joining said two sides; grooved resilient mounting means attached to the second sides of each of said flanges and projecting beyond said peripheral edges; and electrical winding means placed upon said winding form which restrains said flanges in a substantially rigid manner; said grooved mounting means resiliently yielding with respect to said flanges to permit said apparatus to be mounted by means of said grooved mounting means.

2. A self-mounting electrical apparatus, including: an electrically insulating winding form including a pair of flanges joined by a winding portion to define winding space means; each of said flanges having a first side adjacent said winding space means, a second side remote from said first side, and a peripheral edge joining said two sides; grooved resilient mounting means attached to the second side of each of said flanges and projecting beyond said peripheral edges; and electrical apparatus means including electrical winding means placed upon said winding form which restrains said flanges in a substantially rigid manner; said grooved mounting means resiliently yielding with respect to said flanges to permit said apparatus to be mounted by means of said grooved mounting means.

3. A self-mounting electrical apparatus, including: a unitary molded winding form of electrically insulating material including at least a pair of flanges joined by a winding portion to define winding space means; each of said flanges having a first side adjacent said winding space means, a second side remote from said first side, and a peripheral edge joining said two sides; grooved mounting means resiliently attached as an integral part of said molded form to the second side of each of said flanges and projecting beyond said peripheral edges; and electrical apparatus means including electrical winding means placed upon said winding form which restrains said flanges in a substantially rigid manner; said grooved mounting means resiliently yielding with respect to said flanges to permit said apparatus to be mounted by means of said grooved mounting means.

4. A self-mounting electrical apparatus, including: a unitary molded winding form of electrically insulating material including a pair of end flanges joined by a winding portion to define winding space means; said winding portion having an opening adapted to receive magnet core means; each of said flanges having a first side adjacent said winding space means, a second side remote from said first side, and a peripheral edge joining said two sides; grooved mounting means resiliently attached as an integral part of said molded form immediately adjacent said opening on the second side of each of said flanges and projecting beyond said peripheral edges; and electrical apparatus means including electrical winding means and said magnetic core means placed upon said winding form which restrains said flanges in a substantially rigid manner; said grooved mounting means resiliently yielding with respect to said flanges to permit said apparatus to be mounted by means of said grooved mounting means.

5. A self-mounting electrical apparatus, including: an electrically insulating winding form including a pair of flanges joined by winding portion means; each of said flanges having a first side adjacent said winding portion means, a second side remote from said first side, and a peripheral edge joining said two sides; grooved resilient mounting means attached to the second side of each of said flanges and projecting beyond said peripheral edges; electrical winding means placed upon said winding form which restrains said flanges in a substantially rigid manner; panel means upon which said electrical winding form is to be mounted; and said panel means including opening means therethrough; said grooved mounting means resiliently yielding with respect to said flanges to permit said apparatus to be mounted by said grooved mounting means passing into said opening means with said grooved mounting means then deflecting into engagement with said opening means.

6. A self-mounting electrical apparatus, including: a unitary molded winding form of electrically insulating material including a pair of end flanges joined by a winding portion to define winding space means; said winding portion having a central opening adapted to receive magnetic core means; each of said flanges having a first side adjacent said winding space means, a second side remote from said first side, and a peripheral edge joining said two sides; grooved resilient mounting means attached as an integral part of said molded winding form immediately adjacent said central opening on the second side of each of said flanges and projecting beyond said peripheral edges; electrical apparatus means including winding means and said magnetic core means placed upon said winding form thereby restraining said flanges in a substantially rigid manner; panel means upon which said electric apparatus is to be mounted; and said panel means including opening means therethrough; said grooved mounting means resiliently yielding with respect to said flanges to permit said apparatus to be mounted by said grooved mounting means passing into said panel opening means with said grooved mounting means then deflecting into engagement with said panel opening means.

7. A self-mounting electrical apparatus, including: an electrically insulating winding form including a pair of flanges joined by winding portion means; each of said flanges having a first side adjacent said winding portion means, a second side remote from said first side, and a peripheral edge joining said two sides; grooved resilient mounting means attached to the second side of each of said flanges and projecting beyond said peripheral edges; electrical winding means placed upon said winding form which restrains said flanges in a substantially rigid manner; panel means upon which said electrical winding form is to be mounted; said panel means including opening means therethrough; and wedge means for locking said winding form to said panel means; said grooved mounting means resiliently yielding with respect to said flanges to permit said apparatus to be mounted by said grooved mounting means passing into said opening means with said grooved mounting means then deflecting into engagement with said opening means; said wedge means then stiffening said resilient mounting means to prevent said grooved resilient mounting means from being removed from said opening means by again deflecting.

8. A self-mounting electrical apparatus, including: an electrically insulating winding form including a pair of flanges joined by winding portion means; each of said flanges having a first side adjacent said winding portion means, a second side remote from said first side, and a peripheral edge joining said two sides; grooved resilient mounting means attached to the second side of each of said flanges and projecting beyond said peripheral edges; electrical winding means placed upon said winding form which restrains said flanges in a substantially rigid manner; panel means upon which said electrical winding form is to be mounted; said panel means including opening means therethrough; and wedge means for locking said winding form to said panel means; said grooved mounting means resiliently yielding with respect to said flanges to permit said apparatus to be mounted by said grooved mounting means passing into said opening means with said grooved mounting means then deflecting into engagement with said opening means; said wedge means then reducing the area of said opening means to prevent said grooved resilient mounting means from being removed from said opening means by again deflecting said mounting means.

9. A self-mounting electrical apparatus, including: an electrically insulating winding form including a pair of flanges joined by winding portion means; each of said flanges having a first side adjacent said winding portion means, a second side remote from said first side, and a peripheral edge joining said two sides; grooved resilient mounting means attached to the second side of each of said flanges and projecting beyond said peripheral edges; electrical winding means placed upon said winding form which restrains said flanges in a substantially rigid manner; panel means upon which said electrical winding form is to be mounted; said panel means including opening means therethrough; and wedge means formed of a deformable portion of said panel means locking said winding form to said panel means; said grooved mounting means resiliently yielding with respect to said flanges to permit said apparatus to be mounted by said grooved mounting means passing into said opening means with said grooved mounting means then deflecting into engagement with said opening means; said deformable portion of said panel means then reducing the area of said opening means to prevent said grooved resilient mounting means from being removed from said opening means by again deflecting said mounting means.

10. A self-mounting electrical apparatus, including: an electrically insulating winding form including a pair of flanges joined by winding portion means; each of said flanges having a first side adjacent said winding portion means, a second side remote from said first side, and a peripheral edge joining said two sides; grooved resilient mounting means attached to the second side of each of said flanges and projecting beyond said peripheral edges; electrical winding means placed upon said winding form which restrains said flanges in a substantially rigid manner; panel means upon which said electrical winding form is to be mounted; said panel means including openings therethrough; and wedge means for locking said winding to said panel means; said grooved mounting means resiliently yielding with respect to said flanges to permit said apparatus to be mounted by said grooved mounting means passing into said openings with said grooved mounting means then deflecting into engagement with said openings; said wedge means inserted betwen the second sides of said flanges and said resilient mounting means through said openings to reduce the area of said openings to lock said mounting means from being removed from said openings by again deflecting said mounting means.

References Cited by the Examiner
UNITED STATES PATENTS

| | | | |
|---|---|---|---|
| 2,706,742 | 4/55 | Ehlers | 336—192 |
| 2,932,771 | 4/60 | Craven | 317—99 |
| 3,083,930 | 4/63 | Brekke | 336—198 |

JOHN F. BURNS, *Primary Examiner*.